United States Patent
Grant

[19]

[11] Patent Number: 5,912,823
[45] Date of Patent: Jun. 15, 1999

[54] METHOD FOR DETERMINING THE VELOCITY OF A THREE-DIMENSIONAL FLUID FLOW OVER A SUBMERGED BODY

[75] Inventor: John Russell Grant, Jamestown, R.I.

[73] Assignee: The United States of America as represented by the Secretary of the Navy, Washington, D.C.

[21] Appl. No.: 07/777,045

[22] Filed: Oct. 6, 1991

[51] Int. Cl.[6] .............................. G06G 7/57; G06F 17/00
[52] U.S. Cl. .......................................................... 364/578
[58] Field of Search ................................. 364/510, 554, 364/564, 578

[56] References Cited

U.S. PATENT DOCUMENTS 4,685,534  8/1987  Burstein ................................. 181/251

Primary Examiner—Michael Zanelli
Attorney, Agent, or Firm—Michael J. McGowan; Prithvi C. Lall; Michael F. Oglo

[57] ABSTRACT

A method for determining the velocity of a three-dimensional fluid flow over a submerged body is provided. A plurality of finite volume cylindrical elements are used to represent the distribution of vorticity at the surface geometry of the body. The vorticity distribution is used to determine the velocity field of the flow according to the Biot-Savart integral which is solved for in a cylindrical coordinate system.

3 Claims, 3 Drawing Sheets

METHOD FOR DETERMINING THE VELOCITY OF A THREE-DIMENSIONAL FLUID FLOW OVER A SUBMERGED BODY

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to computational fluid dynamics and more particularly to a method for determining the velocity of a three-dimensional fluid flow over a body submerged in the fluid.

(2) Description of the Prior Art

By determining the distribution (strength and location) of vorticity in a moving fluid, it is possible to determine the velocity and pressure fields in the fluid. Consequently, techniques which determine the strength and location of vorticity provide a powerful, flexible approach to computational fluid dynamics by focusing on an elemental aspect of fluid flow. The relationship equating vorticity to the curl of the velocity field, often introduced as the definition of vorticity, governs the generation of velocity from a prescribed distribution of vorticity. Appropriate boundary conditions complete the specification of the flow. The homogeneous solution to this equation, namely, velocity given by the gradient of a scalar function, is the familiar potential flow occurring exterior to regions of vorticity. For a fluid flow over a body, potential flows typically are invoked to investigate features for which the effects of the no-slip condition at the body surface are not crucial. These flows may be generated by velocity sources located on the body surface. The strength of these sources is determined by the no-flux condition at the surface. In the more general case, flow satisfying both the no-slip and the no-flux conditions at a body surface can be produced solely by a distribution of vorticity on the body surface.

An analogous relationship appears in magnetostatics, where Ampere's Law relates the curl of the magnetic field intensity to the current density. In this case, the current density is the source of the magnetic field intensity. Given a distribution of current density and relevant boundary conditions, the magnetic field intensity can be computed by the inversion of the differential equation. This inversion is, of course, the Biot-Savart Law. Similarly, for incompressible fluid flow this law provides the velocity field associated with a vorticity distribution.

This technique has advantages over the more widely pursued solution of the velocity-pressure form of the Navier-Stokes equations. One advantage is that the vorticity form of these equations does not contain pressure, unless the baroclinic term is retained. The absence of the pressure variable reduces the number of unknowns in the problem by one and allows the omission of the complex calculations required to determine the pressure. A second important advantage is that in many flows (e.g., boundary layers, wakes, jets, plumes, shear layers) the vorticity is confined to a relatively small portion of the space occupied by the flow. This concentration of the source of velocity allows a similar concentration of the computational resources on the region of significant vorticity.

The challenges presented in using vorticity to compute fluid flow are the accurate depiction of the spatial distribution of the vorticity field and the stepping of this field forward in time such that it obeys the vorticity equation. One prior art approach represents the vorticity field on a grid much in the same way that Navier-Stokes Solutions represent velocity and pressure on a grid. The grid points can be concentrated into the regions of the flow where vorticity is located. However, an accurate depiction of vorticity requires computation at numerous grid points.

A second prior art approach represents the vorticity field as a set of functions of compact support. The rate of change of location of members of the set is given by the local velocity and the strength of molecular diffusion. This latter approach is possible because vorticity is transported by the velocity field as material elements. This technique, known as the discrete-vortex-element method, does not have the problems of artificial viscosity often found in grid-based techniques and is therefore well-suited to cases of only slightly viscous (i.e., high Reynolds number) flow. The discrete-vortex-element technique is Lagrangian, so that for cases where part of the flow boundary moves with respect to other parts, the problem of adjusting a computational grid to the changing boundary locations is avoided. Finally, the technique amounts to a self-adapting grid, where the number density of elements tends to increase as local velocity gradients (vorticity) develop.

Since the ground-breaking work of Chorin, the discrete-vortex-element method has enjoyed substantial success in simulating two-dimensional flows. In particular, Chorin implements a vortex 'blob', where the vorticity is distributed uniformly over a disk in his two-dimensional calculations. Later, Chorin suggested a modification where vorticity near a flow boundary is represented on a basis of planar, tile-like elements. Many subsequent researchers have adopted these forms for investigations into two-dimensional flow.

For three-dimensional studies, an early proposal for the geometrical form of the three-dimensional elements was a collection of point vortices. As shown in FIG. 1, an incoming three-dimensional fluid flow, represented by arrow 10, is moving over a submerged body surface 11. Numerous point vortices 12, are chosen for computing vorticity (i.e. velocity) of the fluid flow 10. The spinning, represented by rotational arrows 13, of the fluid associated with each point vortex 12 is extremely fast (mathematically infinite) near the point itself. Accordingly, this approach requires an artificial smoothing or smearing out of point vortices 12 which leads to inaccurate vorticity distributions (i.e. velocity determination). In addition, numerous point vortices 12 are required to adequately represent the three-dimensional physical distribution of vorticity in the flow thereby leading to complex computations.

SUMMARY OF THE INVENTION

Accordingly, it is an object of the present invention to provide a method of depicting the vorticity in a fluid flow such that the vorticity and corresponding velocity are computed more accurately and efficiently than the point vortice method.

Another object of the present invention to provide a method of accurately determining the velocity of a three-dimensional fluid flow over a submerged body based on vorticity strength distribution.

Still another object of the present invention is to provide a method of determining the velocity of a three-dimensional fluid flow over a submerged body that simplifies the computational mathematics that relates the vorticity strength distribution to the velocity field.

Other objects and advantages of the present invention will become more obvious hereinafter in the specification and drawings.

In accordance with the present invention, a method is provided for determining the velocity of a three-dimensional fluid flow over a submerged body. A plurality of finite volume elements are selected to represent the vorticity distribution of the fluid flow at the surface geometry of the body. In the preferred embodiment, each finite volume element is a cylinder having its centerline axis along the direction of vorticity. The vorticity strength distribution over each of the cylinders is then determined and integrated in a cylindrical coordinate system using the Biot-Savart Law to determine the velocity of each cylinder.

DESCRIPTION OF THE PREFERRED EMBODIMENTS

Figure 1:
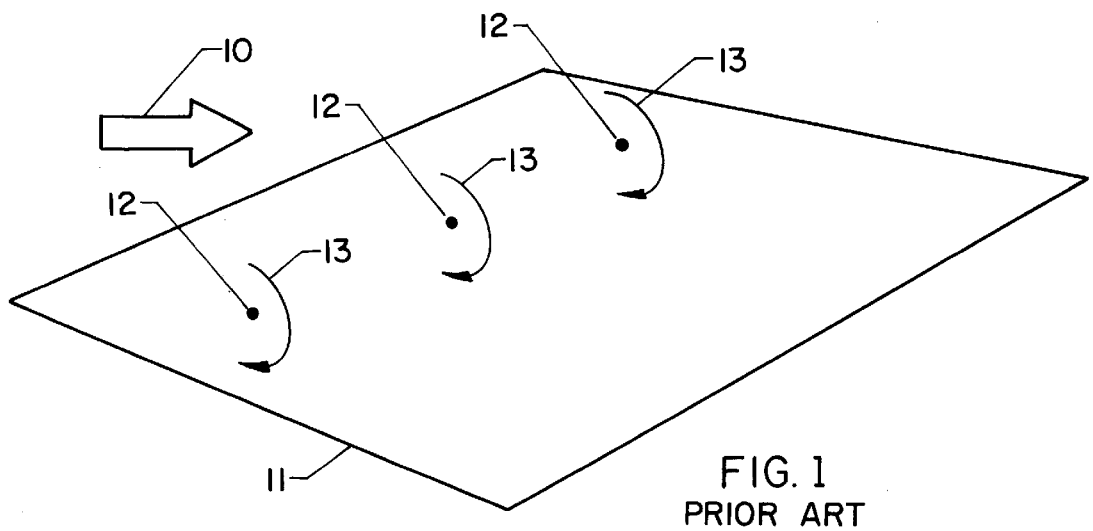
FIG. 1 is perspective view of a fluid flow over a body surface whereby vorticity strength distribution is computed at numerous point vortices at the surface of the body according to a prior art method.
Figure 2:
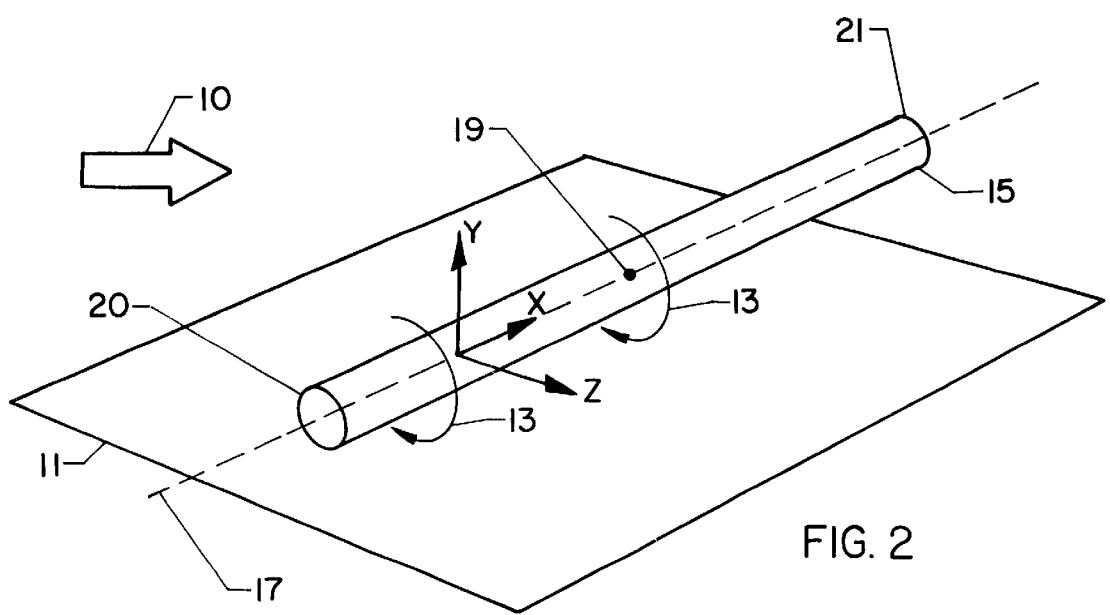
FIG. 2 is a perspective view of a fluid flow over a body surface whereby vorticity strength distribution is computed over a finite cylindrical volume according to the method of the present invention.

Referring now to the drawings, and in particular to FIG. 2, an incoming three-dimensional fluid flow, represented by arrow 10, is moving over a submerged body surface 11. In the present invention, the fundamental building block selected to represent vorticity in the flow 10 is a finite volume element over which the vorticity is distributed. In the preferred embodiment, each finite element is a cylinder 15. The length, diameter and strength of the cylindrical vortex element such as 15 are determined by the laws of fluid dynamics applied to the boundary of the body in the flow. In practice, a plurality of cylinders are used to determine the strength of vorticity distribution. However, for sake of simplicity, only one cylinder 15 will be used to describe the method of the present invention. The vorticity is specified to be uniform over the length of cylinder 15 and around any circumference thereof. The strength of vorticity will vary as a Gaussian distribution over the distance from the centerline axis, represented by dotted line 17, of cylinder 15.

The direction of vorticity $\omega$ will be the x-axis. The y-axis will be defined such that the point $$\vec{x} = (x, y, 0) \quad (1)$$

where the velocity is to be determined lies in the xy-plane. Accordingly, the z-axis is the direction of velocity to be determined.

As is well known in the art, determining the strength and location of the vorticity of the flow 10 is an elemental step towards the determination of the associated velocity field. The association of velocity to an arbitrary vorticity distribution is the Biot-Savart Law.

$$\vec{u}(\vec{x}) = \frac{1}{4\pi} \int \frac{\vec{\omega}(\vec{x}') * (\vec{x} - \vec{x}')}{|\vec{x} - \vec{x}'|^3} d^3 x' \quad (2)$$

This is a three-dimensional integral computed over all space where the vorticity distribution is non-zero. However, integrating this over the entire cylinder 15 is complicated, and therefore would be extremely time consuming if attempted numerically as part of the computation of flow over a submerged body.

Accordingly, an important step of the present method is the theoretical calculation of the Biot-Savart integral for this vortex element. The solution to the integral provides the computational basis to determine the velocity associated with a vortex element. The integration is performed using cylindrical coordinates (x', r', θ') where x' denotes the length along cylinder 15, r' denotes the radial distance from centerline axis 17 and θ' denotes the angle around cylinder 15. The origin 19 for this coordinate system is centered in cylinder 15 halfway between its ends 20 and 21. The Biot-Savart integral for velocity in the z-direction then becomes:

$$u_z(x, y) = \frac{1}{4\pi} \int_0^\infty dr' r' \int_0^{2\pi} d\theta' (y - r'\cos\theta') * \quad (3)$$

$$\int_{-L/2}^{L/2} dx' [(x - x')^2 + y^2 + r'^2 - 2yr'\cos\theta']^{-3/2} * \omega(x', r', \theta')$$

where sign "*" hereinafter means multiplication of the terms involved and L is the length of cylinder 15 and in cylindrical coordinates $$d^3 x' = r' dr' d\theta' dx'. \quad (4)$$

Since $\omega$ is independent of x' and θ' in cylindrical coordinates, the x' integration becomes:

$$\frac{1}{2\pi} \int_0^\infty dr' r' \omega(r') \int_0^\pi d\theta' \frac{y - r'\cos\theta'}{r'^2 + y^2 - 2r' y\cos\theta'} * \quad (5)$$

$$\left\{ \frac{\frac{L}{2} - x}{\left[\left(\frac{L}{2} - x\right)^2 + y^2 + r'^2 - 2yr'\cos\theta'\right]^{1/2}} + \frac{\frac{L}{2} + x}{\left[\left(\frac{L}{2} + x\right)^2 + y^2 + r'^2 - 2yr'\cos\theta'\right]^{1/2}} \right\}$$

Note that in the vicinity of the ends 20 and 21 (x=L/2 or −L/2) of cylinder 15, there is not much contribution to the integral. Furthermore, since the vorticity distribution is Gaussian, most of the integral comes from vorticity near the centerline axis 17 and away from the ends 20 and 21 of the cylinder 15.

By selecting a cylinder whose ends are not close to the midpoint of the cylinder the variation of the denominators in equation (5) with respect to angle θ' will be slight wherever the integrand is not small, i.e. θ'=0 or π. Accordingly, cylinder 15 is chosen such that its length L is at least twice its diameter. Note that for the integration from θ'=0 to π, the denominators are the same. Thus, the integral in equation (5) may be accurately approximated by ignoring any variation of the denominators with the θ' variable. When this variation is ignored, the integral of equation (5) becomes:

$$u_z(x,y) = \frac{1}{2\pi} \int_0^\infty dr' r' \omega(r') * \qquad (6)$$

$$\left\{ \frac{\frac{L}{2}-x}{\left[\left(\frac{L}{2}-x\right)^2+y^2+r'^2\right]^{1/2}} + \frac{\frac{L}{2}+x}{\left[\left(\frac{L}{2}+x\right)^2+y^2+r'^2\right]^{1/2}} \right\} *$$

$$\int_0^\pi d\theta' \frac{y-r'\cos\theta'}{r'^2+y^2-2yr'\cos\theta'}$$

The integration over θ' is performed by writing:

$$\int_0^\pi d\theta' y - \frac{r'\cos\theta'}{y^2-2r'y\cos\theta'+r'^2} = \frac{1}{y}\int_0^\pi d\theta' 1 - \frac{a\cos\theta'}{1-2a\cos\theta'+a^2} \qquad (7)$$

where a=r'/y. The integral in terms of a is one of the well known forms given by formulae (3.613.2 and 3.616.2) in *Tables of Integrals, Series and Products*, I. S. Gradshteyn and I. W. Ryzhik, Academic Press (1965). Using these formulae, equation (7), in terms of r' and y, is equal to:

π/y for r'≤y 0 for r'>y

The remaining integral from equation (6) with respect to r' may be written:

$$u_z = \qquad (8)$$

$$\frac{1}{2}\int_0^y dr' \omega(r')\frac{r'}{y} \left\{ \frac{\frac{L}{2}+x}{\sqrt{\left(\frac{L}{2}+x\right)+y^2+r'^2}} + \frac{\frac{L}{2}-x}{\sqrt{\left(\frac{L}{2}-x\right)+y^2+r'^2}} \right\}$$

Recalling that the radial distribution of vorticity within an element is specified to be Gaussian such that:

$$\omega(r') = \omega_0 e^{-(r'/R)^2} \qquad (9)$$

and defining σ=(r'/R)², equation (8) can be rewritten as follows:

$$u_z = \frac{1}{4}\omega_0 R \left\{ \frac{\frac{L}{2}+x}{y} \int_0^{(y/R)^2} \frac{e^{-\sigma} d\sigma}{\sqrt{\sigma+r_+^2/R^2}} \right\} + \qquad (10)$$

$$\frac{1}{4}\omega_0 R \left\{ \frac{\frac{L}{2}-x}{y} \int_0^{(y/R)^2} \frac{e^{-\sigma} d\sigma}{\sqrt{\sigma+r_-^2/R^2}} \right\}$$

where $r_\pm^2 = (L/2 \pm x)^2$. The integrals with respect to σ in equation (10) are of the well known form given by a formula (3.361.1) from Gradshteyn and Rhyzik. Using this formula produces the equation of velocity at position (x,y,0) relative to a cylindrical vortex of strength $\omega_0$, length L, and Gaussian radial scale R such that:

$$u_z(x,y) = \frac{\sqrt{\pi}}{4}\frac{\omega_0 R}{y}\left\{\left(\frac{L}{2}+x\right)e^{(r_+/R)^2}\left[\Phi\left(\sqrt{\frac{y^2+r_+^2}{R^2}}\right)-\Phi\left(\sqrt{\frac{r_+^2}{R^2}}\right)\right]\right\} + \qquad (11)$$

$$\frac{\sqrt{\pi}}{4}\frac{\omega_0 R}{y}\left\{\left(\frac{L}{2}-x\right)e^{(r_-/R)^2}\left[\Phi\left(\sqrt{\frac{y^2+r_-^2}{R^2}}\right)-\Phi\left(\sqrt{\frac{r_-^2}{R^2}}\right)\right]\right\}$$

where $r_\pm$ is defined above and Φ is the error function. This expression is the basis for the numerical computation of the fluid flow velocity associated with a single cylindrical vortex element. Thus, the velocity at any instant in time is merely a function of its position, length of the cylindrical element and vorticity strength of the cylindrical element. The computational mathematics of equation (11) are easily performed by any digital computer with adequate memory and speed.

Using the (finite dimensioned) cylindrical vortex elements to compute fluid flow allows the computed flow to move around the body, rather than through the body, in order to satisfy physical boundary conditions. The initial location of a vortex element is on the surface of the body, and its strength $\omega_0$ is found by requiring the vortex element to generate enough velocity to cancel any slip (non-zero velocity) on the surface. Thus, given the location of the element and the radius and length of the element, a strength $\omega_0$ is set so that the associated velocity $u_z$ is the same magnitude and opposite sign to the slip velocity on the surface just beneath the element. Calculation of time-dependent flows could be produced by allowing the newly created elements on the surface to move according to the velocity at their respective locations. As these elements move, a new family of vortex elements is then generated on the surface to add to the existing population of elements. The fundamental laws of fluid dynamics (Navier-Stokes equations) describe how the vortex strengths $\omega_0$ behave as the elements move. The process of generating elements on the body surface according to the boundary conditions, and then allowing them to move downstream to form a wake, could be continued indefinitely.

Figure 3:
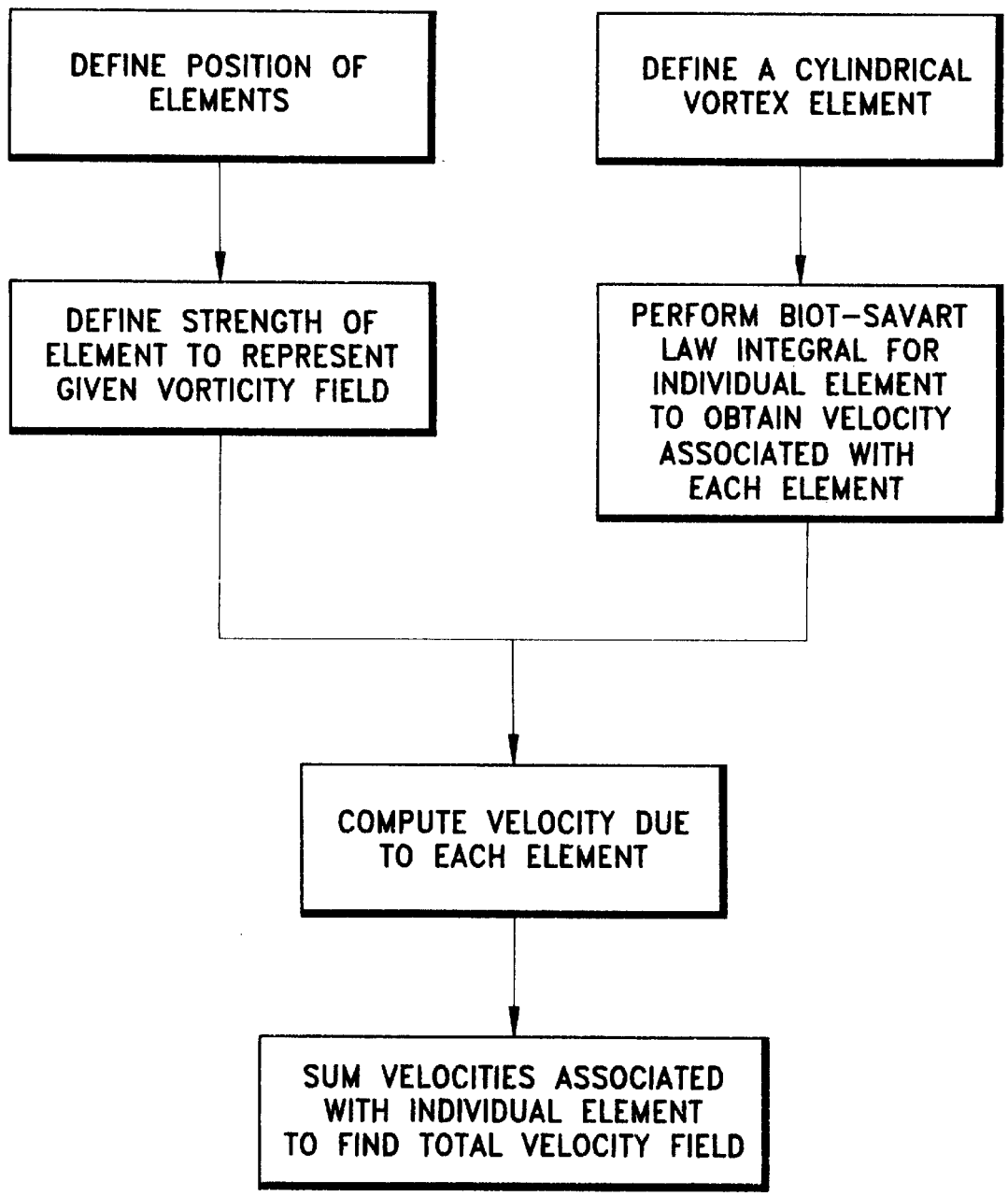
FIG. 3 is a flow diagram of the steps followed in the process for determining the velocity of a three-dimensional fluid flow over a submerged body in the fluid.
Figure 4:
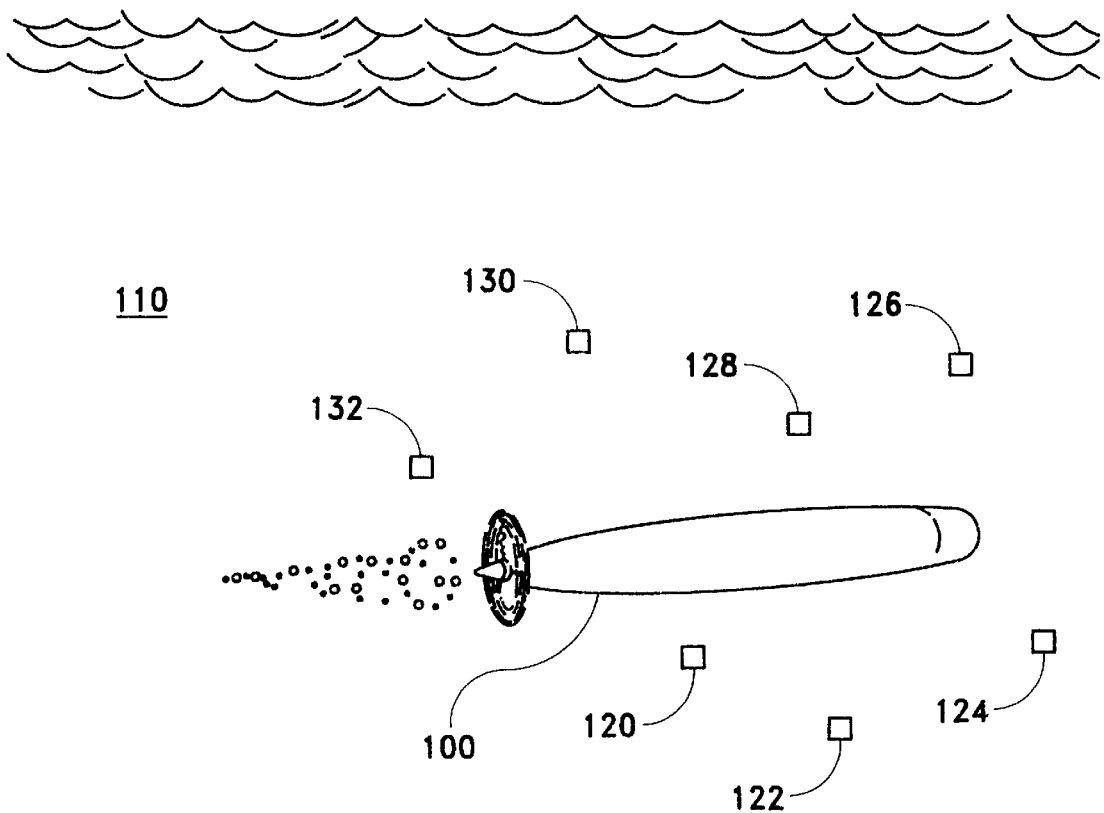
FIG. 4 is block diagram of a method for finding the velocity of a fluid around a moving body submerged in the fluid.

According to the teachings of subject invention, the method for determining the velocity of a three-dimensional fluid flow over a moving body submerged in the fluid is shown in a block diagram of FIG. 3. The process includes defining position of vortex elements and the strength of each element to represent given vorticity field. At the same time, a cylindrical vortex element is defined and Biot-Savart law integral is performed thereover to obtain the velocity associated with each vortex element and the strength of each vortex element. From the velocity associated with each vortex element and the strength thereof to represent the given vorticity field, velocity due to each element is computed using an alogrithm and a general purpose computer having adequate memory and speed. The velocities associated with each individual element are summed to find total velocity field. The values of the velocity computed in the velocity field are then compared with the experimentally determined values by using experiment in FIG. 4 wherein moving body 100 is submerged in fluid 110 and velocity sensors 120, 124, 126, 128, 130, 132 are placed in the region around the submerged moving body 100. The results obtained by using the method of subject invention are in close agreement with the experimentally determined values.

The advantages of the present invention are numerous. By representing the distribution of vorticity along a finite cylindrical element, the computation of the associated velocity field is more physically correct than the previously used point vortex approach. The point vortex approach requires a smoothing operation to avoid a description of the fluid flow at the point vortex where the vortex is spinning at a mathematically infinite speed. However, the method of the present invention automatically yields solid body rotation near the cylindrical vortex element axis. In addition, fewer elements are required to represent a specific vorticity distribution to a desired accuracy as compared with the point vortex approach.

It will also be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. In a computerized method for determining the velocity field of a three-dimensional fluid flow over a submerged body by determining vorticity strength distribution at the surface of the submerged body, the improvement comprising the step of representing vorticity distribution of the fluid flow at the surface geometry of the body in terms of a plurality of finite volume elements.

2. A method as in claim 1 wherein each of said finite volume elements is a cylinder having its centerline axis along the direction of vorticity.

3. A method as in claim 2 wherein the length of each of said cylinders is at least twice its diameter.

* * * * *